Patented Nov. 21, 1950

2,531,355

UNITED STATES PATENT OFFICE 2,531,355

PARA-VINYLBENZYL COMPOUNDS

William S. Emerson, Dayton, Ohio, assignor to Monsanto Chemical Company, St. Louis, Mo., a corporation of Delaware No Drawing. Application June 22, 1946, Serial No. 678,673

8 Claims. (Cl. 260—89.1)

This invention relates to new vinylbenzene compounds having para-substituents and to the preparation of such materials. It provides an efficient and inexpensive method whereby paravinylbenzene acetate may be derived from para-(alpha-acetoxyethyl) benzyl acetate.

An object of the invention is to provide novel vinyl compounds for use in polymeric compositions including copolymers, and particularly as copolymers with styrene. Such compositions are characterized by strength and toughness. Another object is to provide new compounds which may be used as intermediates in chemical synthesis. A further object is the provision of a process for effecting reaction to produce vinyl compounds. Other objects and advantages of the invention will be apparent to those skilled in the art from the following description.

The process of pyrolysis by which the novel compounds of the invention are derived has been found to give results which are contrary to the expected predictions of this branch of chemistry. The step of pyrolysis which, in the case of vinyl compounds, leads easily to resinification and resultant plugging of the heating conduit has been discovered to be controllable by the use of added steam. The product obtained by the pyrolysis of para-(alpha-acetoxyethyl) benzyl acetate is not the alcohol, as would be expected, but has been found to be the para-vinylbenzyl acetate.

The instant process is carried out using para-(alpha-acetoxyethyl) benzyl acetate as a starting material. The manufacture of this particular compound is shown in my copending application Serial No. 678,672, filed June 22, 1946 (now issued as Patent No. 2,439,204), which includes the successive steps of making ethylbenzene, para-ethylbenzyl chloride, para-ethylbenzyl acetate, para-acetylbenzyl acetate, para-(alpha-hydroxyethyl) benzyl acetate, and para-(alpha-acetoxyethyl) benzyl acetate.

The following examples illustrate embodiments of the preparation and properties of the chemical compounds which comprise the present invention:

*Para-vinylbenzyl acetate.*—A vertically situated quartz tube provided with an external heating coil was used for the pyrolysis. The tube was packed with silica gel as a catalyst and was kept at 475–500° C. with the introduction of steam at a pressure of 25–30 mm. 139.5 g. of para-(alpha-acetoxyethyl) benzyl acetate was introduced over a 100 minute period. The tube was steamed for another 10 minutes, cooled, and washed with benzene. The combined distillate and washings were twice extracted with benzene. The combined extracts were distilled from sulfur and hydroquinone to give a 72% yield of para-vinylbenzyl acetate, B. P. 128–158°/15 mm., $n_D^{25}$ 1.5348. An analytical sample boiled at 136–139°/15 mm., $n_D^{25}$ 1.5350, $d_4^{25}$ 1.051

Anal. Calcd. for $C_{11}H_{12}O_2$: C, 75.0; H, 6.82.
Found: C, 75.1; H, 6.96.

*Para-vinylbenzyl alcohol.*—A solution of 3.5 g. of para-vinylbenzyl acetate, 3.5 g. of potassium hydroxide, 0.5 g. of sulfur and 0.5 g. of hydroquinone in 25 cc. of ethyl alcohol was boiled under reflux for ½ hour. It was then diluted with 200 cc. of water, acidified with 5 cc. of glacial acetic acid and twice extracted with benzene. The combined extracts were filtered and distilled to yield one g. (38% yield) of para-vinylbenzyl alcohol, B. P. 132–137°/15 mm., $n_D^{25}$ 1.5687. The sample was redistilled at 5 mm. before analysis.

Anal. Calcd. for $C_9H_{10}O$: C, 80.6; H, 7.47.
Found: C, 79.8; H, 7.37.

Specifically this invention provides the new compounds corresponding to the formula:

where R is selected from the group consisting of —H and

as well as the polymers thereof.

The above reactions to produce para-vinylbenzyl acetate are brought about under the influence of heat, and may be termed a pyrolysis. An extended surface material such as silica gel may also be applied in this relationship. I have found that the use of steam is a necessary part of the invention and that operations without such an added material results in resinification in the reaction tube, which may plug the reactor entirely.

The result accomplished in subjecting para-(alpha-acetoxyethyl) benzyl acetate to this pyrolysis step gives an unexpected result in that an alcohol would be expected to be formed (as a result of hydrolysis in the presence of steam), whereas the para-vinylbenzyl acetate is obtained instead.

The vinyl compounds of the instant invention may be polymerized per se, or as copolymers with other compounds containing an ethylenic double bond, such as styrene for example. The proportion of the vinyl compound in the copolymeric mixtures is not critical and may be varied from mere traces to very large amounts, depending upon the physical properties desired in the resulting interpolymer.

A small sample of the para-vinylbenzyl alcohol was heated to 100° C. for a day in the presence of about 0.1% of benzoyl peroxide. Other polymerization catalysts may also be used. Polymeric para-vinylbenzyl alcohol was obtained as a hard solid. The para-vinylbenzyl acetate may also be polymerized alone or as a copolymer.

The para-vinylbenzyl acetate was tested in the following manner: A mixture containing 10% of the acetate with 90% of monomeric styrene was heated to 125° C. for six days. It was found that no polymerizaztion catalyst was necessary. The product was a hard, colorless, transparent resin. Upon testing, the tensile and flexural strengths were found to be of the same order as those of styrene, and the elongation was found to be 3.9%, which is almost double that of polymeric styrene.

In view of the above it will be seen that the several objects of the invention are achieved and other advantageous results obtained.

Since many changes could be made in the above methods and products without departing from the scope of the invention, it is intended that all matter contained in the above description shall be interpreted as illustrative and not in a limiting sense and that the invention is to be construed broadly and restricted solely by the scope of the appended claims.

What I claim is:
1. The compounds having the formula:

where R is selected from the group consisting of —H and

2. Para-vinylbenzyl alcohol.
3. Para-vinylbenzyl acetate.
4. The polymeric form of the compounds defined in claim 1.
5. Polymeric para-vinylbenzyl alcohol.
6. Polymeric para-vinylbenzyl acetate.
7. The process for producing para-vinylbenzyl acetate which comprises passing para-(alpha-acetoxyethyl) benzyl acetate in vapor phase in contact with silica gel at a temperature of about 300° C. to about 600° C. in the presence of steam to reduce resinification during the contacting with silica gel.
8. The process for producing para-vinylbenzyl acetate which comprises pyrolyzing para-(alpha-acetoxyethyl) benzyl acetate with silica gel in the presence of steam.

WILLIAM S. EMERSON.

REFERENCES CITED

The following references are of record in the file of this patent:

UNITED STATES PATENTS

| Number | Name | Date |
|---|---|---|
| 2,383,922 | Soday | Aug. 28, 1945 |

OTHER REFERENCES

Marvel et al: "Journal American Chemical Society," vol. 67, Dec. 1945, pages 2250–2252.

Journal of the Chemical Society of London, vol. 33, page 214, Perkin.